United States Patent [19]
Hardiman et al.

[11] Patent Number: 5,504,672
[45] Date of Patent: Apr. 2, 1996

[54] INDUSTRIAL PROCESS CONTROLLER AND METHOD OF PROCESS CONTROL

[76] Inventors: Ted L. Hardiman, 10221 Rockwood Rd., Charlotte, N.C. 28215; John W. Carlson, Rte. 9, P.O. Box 930, Hiram La., Mooresville, N.C. 28115

[21] Appl. No.: 120,018

[22] Filed: Sep. 10, 1993

[51] Int. Cl.$^6$ .................................................. G05B 13/02
[52] U.S. Cl. ........................ 364/165; 364/162; 364/164
[58] Field of Search .................................... 364/161, 162, 364/163, 164, 165; 318/561, 609, 610, 632

[56] References Cited

U.S. PATENT DOCUMENTS

| | | |
|---|---|---|
| 3,786,242 | 1/1974 | Brooks. |
| 4,408,148 | 10/1983 | Herzog. |
| 4,415,966 | 11/1983 | Herzog. |
| 4,489,376 | 12/1984 | Putman. |
| 4,520,301 | 5/1985 | Suzuki. |
| 4,549,123 | 10/1985 | Hagglund et al.. |
| 4,587,470 | 5/1986 | Yamawaki. |
| 4,698,574 | 10/1987 | Yoshizawa et al.. |
| 4,714,988 | 12/1987 | Hiroi et al.. |
| 4,754,391 | 6/1988 | Suzuki. |
| 4,874,999 | 10/1989 | Kawabara et al.. |
| 4,908,747 | 3/1990 | Lane et al.. |
| 4,918,584 | 4/1990 | Goff. |
| 4,951,191 | 8/1990 | Hiroi et al.. |
| 5,043,863 | 8/1991 | Bristol et al.. |
| 5,119,288 | 6/1992 | Hiroi. |
| 5,223,778 | 6/1993 | Svarovsky et al. ................. 318/610 |

FOREIGN PATENT DOCUMENTS

| | | |
|---|---|---|
| 0308621 | 3/1989 | European Pat. Off.. |
| 2683644 | 6/1992 | France. |
| 4038857A1 | 4/1992 | Germany. |
| 58214905 | 12/1983 | Japan. |

OTHER PUBLICATIONS

Donald G. Fink and Donald Christiansen, *Electronics Engineers'Handbook*, McGraw—Hill Book Company, Third Edition, 1989, Section 24, pp. 24–1 to 24–47.

*Primary Examiner*—Roy N. Envall, Jr.
*Assistant Examiner*—Steven R. Garland
*Attorney, Agent, or Firm*—Bell, Seltzer, Park & Gibson

[57] ABSTRACT

An industrial process controller, and methods of controlling an industrial process, are provided for controlling a process variable responsive to a set point. The industrial process controller has a differentiator for determining a difference signal between a process variable and a set point. A timing synchronizer is operatively connected to the differentiator for generating a synchronized timing reference signal responsive to the difference signal. A feedforward controller is operatively connected to the differentiator and the timing synchronizer for generating a lead/lag feedforward signal responsive to the difference signal and the synchronized timing reference signal. A proportional and derivative controller is operatively connected to the differentiator and the timing synchronizer for generating an output signal responsive to the difference signal. The proportional and derivative controller has a generator for generating a proportional signal and a derivative signal. A summer combines the output signal of the proportional and derivative controller with the feedforward signal to thereby generate a command signal for the process variable. A feedforward characterizer is operatively connected to the proportional and derivative controller and the summer for providing thereto a characterized feedforward control signal based upon the command signal to thereby control an overall gain between the process variable and the set point of the industrial process.

34 Claims, 6 Drawing Sheets

INDUSTRIAL PROCESS CONTROLLER AND METHOD OF PROCESS CONTROL

FIELD OF THE INVENTION

This invention relates generally to process control systems for controlling linear or nonlinear industrial or similar processes and, more particularly, to an industrial controller for controlling a process variable.

BACKGROUND OF THE INVENTION

The process industries, such as chemical, petroleum, power, food, textile, paper, and metallurgical, continuously or semi-continuously process gases, liquids, or solids. Electronic and mechanical equipment generally measures, indicates, and controls flow, pressure, temperature, level, and composition of these various gases, liquids, or solids. An industrial control system monitors an industrial process and makes changes or adjustments to maintain performance within certain acceptable conditions or limits. Measurement and control of process variables related to these gases, liquids, or solids range from indication and/or regulation of a single process variable to the optimization of the kinetics and throughput of hundreds of variables in an entire industrial plant.

A continuing trend of process manufacturing is to provide maximum profit per unit time of process operation. This emphasis demands larger combinations of assembled equipment and system configurations for industrial process control in order to monitor more data simultaneously; make more efficient control of interactive variables possible; present more information to an operator; insure a high level of availability of the process and continuity of process operation; allow for lower cost expansion, both vertically (i.e., compatibility with high-level computing equipment) and horizontally (i.e., system-size expansion); and facilitate entry of more external data.

Although different control strategies for various industrial process systems have been developed which emphasize different performance characteristics of the system, the functions normally required of the control system include process data acquisition, alarm for abnormal conditions, display and recording of process measurement, set point and output values, single-variable control using standard feedback algorithms, and multi-variable control including cascade, ratio, feedforward, and interacting system configurations. Process-control equipment has continually developed in response to this variety of functional requirements. Advances in electronic component technology and design techniques have facilitated the development of single processing subsystems in electronic devices and have also incorporated distributed information processing in measurement equipment. These advancements have, in turn, enhanced control system precision and flexibility.

An industrial process controller in an industrial process system conventionally establishes the acceptable conditions or limits of performance, often by setting its own reference inputs, and performs various functions on process variables to thereby generate control signals to operate actuators in the control system. These functions may include scaling, linearizing, shaping, algebraic computing, dynamic compensation, signal characterizing (i.e., adjusting lead and lag transfer functions or curve fitting for non-linear functions), or time-function generating for batch operations (i.e., ramp generating or signal programming). The plant or the controlled system is the part of the system that responds to the controller. The control functions of the controller may operate on the process variables in a variety of steady-state and dynamic control modes. The control functions may also hold process variables at predetermined set points or values by manipulating associated control elements in the system.

In an industrial process system in which a process variable is desirably maintained at a set point, a controller compares a measured process signal with the set point and calculates a control signal to minimize the difference. The control functions for such controllers can be implemented in many media, such as pneumatic, mechanical, hydraulic, and electronic analog and digital.

A proportional ("P") control function is one of the most widely known and simplest forms of continuous controls wherein the output control signal is proportional to the deviation between a measured process signal and a set point. Proportional control never brings a process back to the set point. It conventionally maintains the deviation between the set point and process variable. A gain in a process system occurs when the deviation or offset between the process variable and set point increases. A low gain is necessary to maintain process stability and allows for larger offsets from the set point to occur if the measured process signal changes quickly.

Another known control functions is the combination of proportional plus integral ("P+I") functions. This combination provides a wide dynamic proportional band to achieve process stability and high static gain to minimize high offsets at a rate tuned to the process variable dynamics. The P+I function, for example, may be used on flow control loops or at various levels in pressure loops of a control system.

Any control function which includes an integral ("I") function, however, is subject to windup or saturation when a deviation between a measured signal and a set point persists. Although this situation can be somewhat tolerated in a continuous process under control, it is often desired to be prevented on shut down and start up of batch processes. If saturation is not prevented, no control occurs on the start up until the measured signal reaches the set point value. In other words, the process variable may overshoot the set point by an appreciable amount. Thus, when the sequence of process operation calls for automatic start up, all control functions for the new action are within proportional limits. Overshoot is eliminated if the integral time exceeds the time constant of the measured process variable.

Some industrial processes also have several processing steps in series and can be more successfully controlled by the addition of a derivative ("D") or a phase lead function to the P+I function. Temperature control, for example, often requires a P+I+D or PID control function to compensate for the time lags of heaters, vessels, and sensors.

In other control processes, an offset between a measured signal and a set point must be determined before control actually occurs. If the major causes or factors of process variable change can be determined, it is possible to act directly on the measured signal to compensate for a change before its effect is imparted to the control signal and a deviation is caused between the set point and the process variable. This action is known as feedforward control. A feedforward control function is an approximate model of the process. Although it is theoretically possible to use feedforward control only, it is far more realistic to use a combination of feedforward and feedback control functions. The feedforward elements thus reduce the deviation seen by the feedback system, which then only has to correct for the imperfections in the feedforward process model. This technique is particularly applicable to processes having significant dead time, i.e., slow or no response to a measurement.

In a conventional process feedback system, a proportional-plus-integral-plus-derivative (PID) operation reacts to a deviation between a set point and a measured process variable. The PID control, however, has two major problems. First, PID control is purely reactive to process changes; it always trails in time an upset point, i.e., where the measured error starts. Second, oscillations or swings in the process are quite often induced by the PID because of the stored energy in the integral and/or derivative. Often, the system is susceptible to the release of the stored energy of the PID at the wrong time, such as when the process suddenly changes direction, which results in an oscillation.

There are several techniques available to assist in resolving these problems, such as gain that increases with error or integral that increases with error, or self tuning PID's. But the basic problems still exist, the PID is reactive and prone to induced oscillations or swings.

Characterization of the process feedback is common, often necessary, and is done in various ways using signal characterizing that is fixed; or a data collection system to make continuously updated graphical plots of signal characterizers. Characterization of the process demand is also a known technique that is available in systems such as damper linkage variations. Characterization of the process demand is available in recent control systems in parts of systems called variable gain adjustments or variable gain curves that may or may not be automatically adjusted through data collection.

Feedforward control is an improvement over PID control because it is proactive. Feedforward control is common and is done in different ways. The feedforward sometimes has a gain included to help balance the demand and process. The feedforward signal is often run through the PID as a cascade loop, and enters into the control loop as a set point adjustment. The feedforward signal may also be introduced into a control loop after the PID as a sum to the PID output.

The feedforward timing, however, is not always in phase with the process and therefore can cause stability and overshoot problems. To counter balance this tendency, the feedforward conventionally is de-emphasized or detuned. Reset windup or saturation occurs because the error signal to the PID stays offset during feedforward changes, and the reset integrates excessively. This results in swings at the end of the ramp or when the feedforward changes direction because the integral has to unwind.

The conventional feedforward configuration also induces an error into the system because of timing and/or gain mismatch to the process. The PID has to take out or compensate for the error induced by the improper feedforward. This causes process upsets, swings, and oscillations during and after feedforward changes which are highly undesirable in process control systems.

SUMMARY OF THE INVENTION

The present invention provides control of linear and nonlinear processes using a combination of feedforward, feedback, and PID controls. The feedforward control provides a major portion of the system control and the feedback and PID control minor portions of the system control. Feedforward control can do more harm than good if it is not properly characterized and in the right time phase of the process. This invention provides an industrial process controller, and methods of controlling an industrial process, by characterizing and maintaining the correct synchronized timing of a feedforward signal, preventing unnecessary involvement of PID and feedback controls, and offering simple and effective characterization of the process demand or command signal by feedforward characterization.

More particularly, the present invention provides a first embodiment of an industrial process controller for controlling a process variable responsive to a set point. The controller has process variable receiving means for receiving a process variable signal by the process controller indicating a desired process condition to be controlled and set point receiving means for receiving a set point signal by the process controller indicating a set point value for the desired process condition to be controlled. Difference means determines a difference signal between the process variable signal and the set point signal.

Timing synchronization means operatively connected to the difference means generates a synchronized timing reference signal responsive to the difference signal. The timing synchronization means preferably has a timing reference signal generator for generating a timing reference signal and characterization means for characterizing the timing reference signal based upon the difference signal generated by the difference means. The characterizing means of the timing synchronization means generates a function signal responsive to the timing reference signal and the difference signal and changes the function signal at a predetermined time. Feedforward control means operatively connected to the difference means and the timing synchronization means generates a lead/lag feedforward signal responsive to the difference signal and the synchronized timing reference signal.

A proportional and derivative control means operatively connected to the difference means and the feedforward control means generates an output signal responsive to the difference signal and the feedforward signal. The proportional and derivative control means includes means for generating at least a proportional and derivative signal responsive to said difference means, and preferably include means for generating an integral signal responsive to said difference means so that a PID control means is provided. The PID control means preferably includes means for blocking an integral function thereof responsive to the feedforward signal.

Combining means combines the output signal of the PID controller with the feedforward signal to thereby generate a command signal for the process variable. Storing means stores the command signal for control of the process variable. Feedforward characterization means operatively connected to the difference means and the PID control means provides thereto a characterized feedforward signal responsive to the command signal to thereby control an overall gain for the industrial process controller. The feedforward characterization means has means for generating a function signal responsive to the command signal and means for changing the function signal responsive to the output signal of the PID control means. Feedback characterization means operatively connected to the command signal and the process variable receiving means provides characterization of a feedback signal responsive to the process variable signal.

In a second embodiment of the present invention, an industrial process controller as described above with reference to the first embodiment further has tracking means operatively connected to the combining means for tracking the feedforward signal responsive to the command signal and balancing means operatively connected to the combining means for balancing the feedforward signal responsive to the command signal on an input signal external to the process controller such as from another controller or a system operator. This embodiment provides the advantageous capability of upstream and downstream communication with other controllers of an industrial process system, especially for complex industrial process systems.

Methods of controlling an industrial process are also provided according to the present invention. These methods include the steps of receiving a process variable signal for indicating a process condition to control and receiving a set point signal for indicating a desired condition to control. A difference signal is determined between the process variable signal and the set point signal. A synchronized timing signal is generated responsive to the difference signal. A feedforward signal is generated responsive to the difference signal and the synchronized timing reference signal. An output signal of preferably a PID controller is generated responsive to the difference signal. The generating of the output signal of the PID controller includes the step of blocking an integral signal of the PID controller responsive to the feedforward control signal. The output signal of the PID controller is combined with the feedforward signal and a command signal for the process variable is generated therefrom. The command signal for control of the process variable is stored and the feedforward signal is characterized for the process variable responsive to the command signal and the output signal of the PID controller. The feedforward signal is characterized by generating a function signal responsive to the command signal and changing the function signal responsive to the output signal of the PID controller to thereby control an overall gain of the process variable responsive to the set point.

The methods also include the steps of generating a feedback control signal responsive to the command signal and characterizing the feedback signal responsive to the process variable signal for controlling the overall gain of the process variable. The method steps further include tracking and balancing of the feedforward signal responsive to the command signal and an input signal external to the industrial process controller, such as from another controller or a system operator, as discussed with reference to the second embodiment of the present invention.

By synchronizing and maintaining the correct timing of the feedforward signal responsive to the difference between the process variable and the set point in the industrial process, and preventing unnecessary involvement of PID and feedback controls, the lead/lag feedforward control signal for the process demand can be more effectively characterized so that overall gain of the industrial process is more effectively controlled.

BRIEF DESCRIPTION OF THE DRAWINGS

Some of the objects and advantages of the present invention having been stated, others will become apparent as the description proceeds when taken in conjunction with the accompanying drawings, in which.

DETAILED DESCRIPTION OF ILLUSTRATED EMBODIMENTS

The present invention now will be described more fully hereinafter with reference to the accompanying drawings in which illustrated embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides control of linear and nonlinear processes using a combination of feedforward, feedback, and PID controls. The feedforward control provides a major portion of the system controls and feedback and PID control minor portions. Feedforward control can do more harm than good if it is not properly characterized and in the right time phase of the process. This invention provides an industrial process controller, and methods of controlling an industrial process, by maintaining the correct timing synchronization of the feedforward signal, preventing unnecessary involvement of PID and feedback controls, and offering simple and effective characterization of the process demand or command.

In a conventional industrial control system, if a feedforward control function for an industrial process is linear with respect to a process demand or command signal, an output signal of a PID controller used in the system will be near zero. Since the process demand or command signal, however, is most often nonlinear to the process, a relation or characterization, i.e., a curve, between the feedforward control and the process demand needs to be established. The relationship between the process demand and the industrial process will change from time to time through instrument drift, recalibration, system parameters or the like. As the process drifts away from the relationship curve established between the process demand and the process, the PID controller input and output signals will no longer be near zero because the PID controller attempts to correct generated error.

Figure 1:
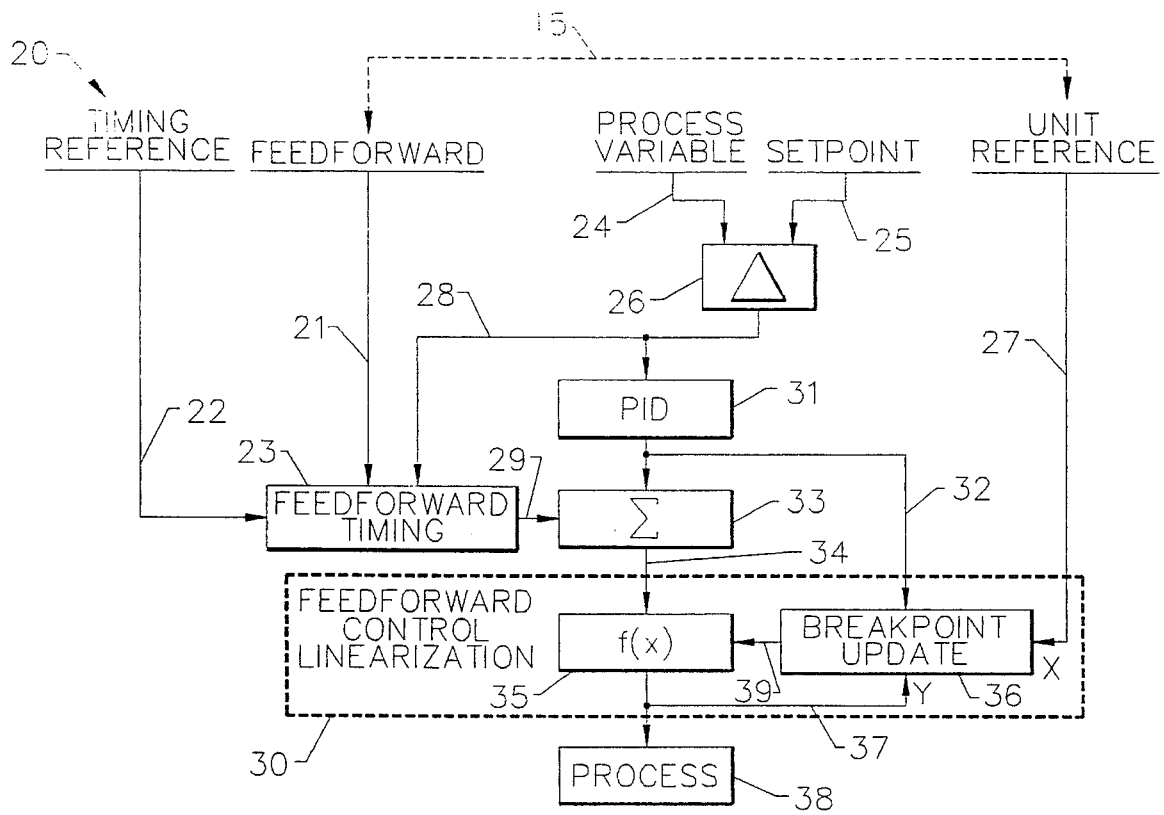
FIG. 1 is a block diagram of an industrial process controller of the present invention.

Referring now to the drawings, FIG. 1 illustrates a block diagram of the industrial process controller 20 characterized for feedforward control of an industrial process according to the present invention. A process variable signal 24 and a set pointsignal 25 are received by the controller into a difference means, shown as differentiator block 26. The differentiator 26 outputs a difference signal or error signal 28 to a proportional and derivative control means, and preferably a proportional, derivative, and integral control means shown as PID controller block 31. A feedforward timing means, shown as feedforward timing block 23, also receives the difference or error signal 28 for use in indexing and calculating a feedforward time curve. The feedforward timing means 23 additionally receives a feedforward signal 21 and a timing reference signal 22 for calculating a feedforward timing curve which will be further described herein with reference to FIG. 2.

Figure 6A:
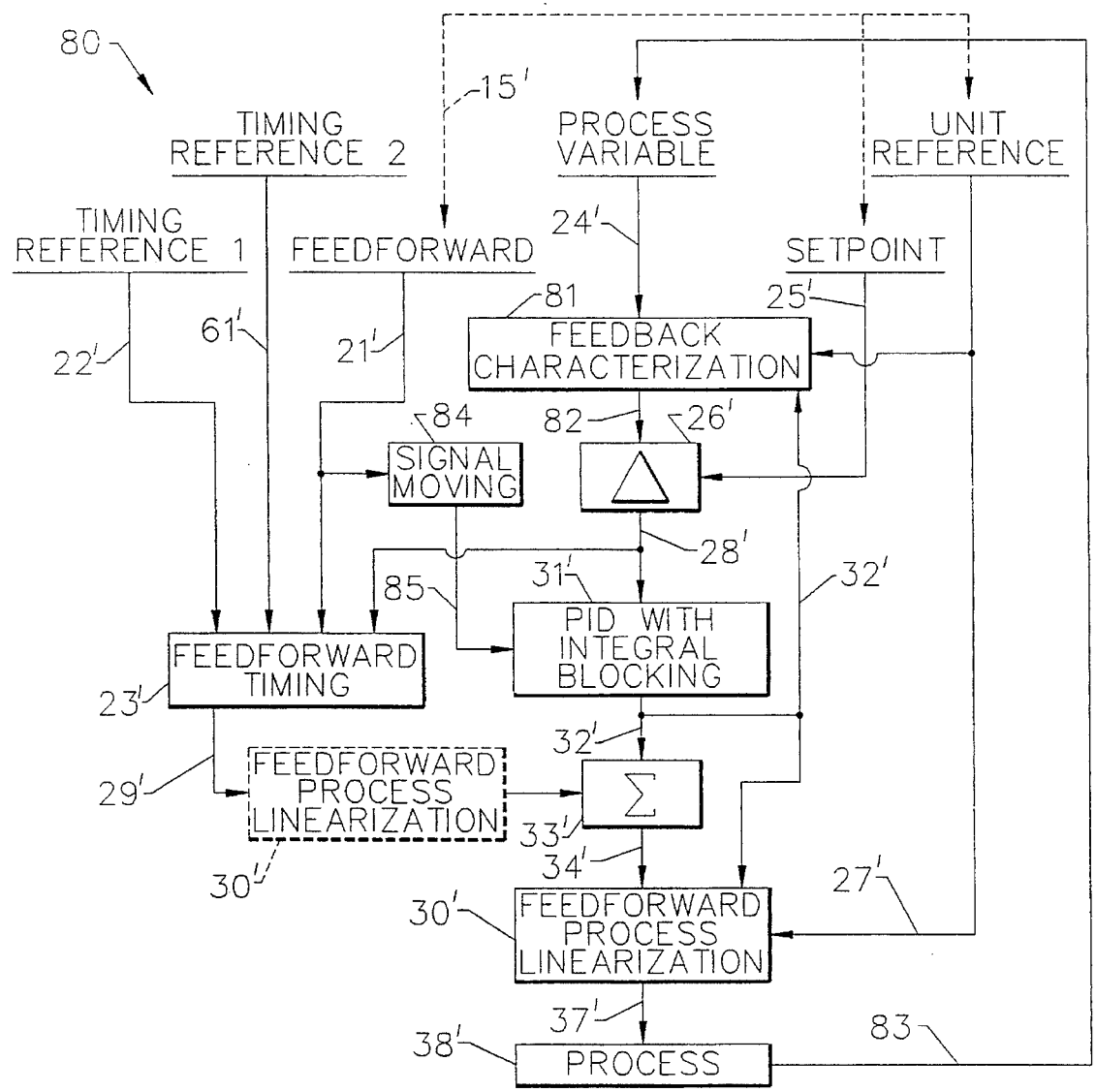
FIG. 6A is a block diagram of an industrial process controller according to a first embodiment of the present invention.

The feedforward timing 23 outputs a feedforward timing signal 29 to combining means, shown as summer or adder block 33. The summer 33 also receives an output signal 32 from the PID controller 31 for combining with the feedforward timing signal 29. In order to generate a feedforward control characterization curve, preferably a linearization curve, according to the present invention, the combined output signal 34 of the summer 33 plus the PID output signal 32 of the PID controller 31 are indexed to a process demand curve. A unit reference signal 27 provides an index to update the breakpoint 36 of the curve. The unit reference signal 27 may be the feedforward signal as shown by dashed line 15. The setpoint 25 may also be the feedforward signal, as best shown in FIG. 6A, by dashed line 15', but preferably only when feedback characterization is used as further discussed herein. It will also be understood that the feedforward signal 21 may also be used as a reference signal to update the breakpoint. When the PID controller is not near zero, the indexed part of the curve will need to be changed by the output signal 32 of the PID controller 31. Function generators, as well known to those skilled in the art, can be used for continuously generating, plotting, and updating the curves.

As shown in FIG. 1, the industrial process controller 20 according to the present invention has a function generator 35 that generates a number of X, Y breakpoints along a curve for providing feedforward control linearization 30. For updating the curve in the function generator 35, the "Y" or output 37 of the curve remains predefined and the "X" breakpoint or input of the curve moves by the unit reference signal 27. The data for this new breakpoint will be accepted only if the process error output signal 32 from the PID controller 31 is near zero, the feedforward control signal 34 is at a steady state condition, and only the nearest breakpoint will be updated. Since the curve between the breakpoint is a straight line, the "X" part of the curve can be updated by using the unit reference signal 27 as an index. The updated "X" breakpoint value and the PID output signal 32 which provides adequate accuracy becomes the summation of the previous "X" breakpoint value plus. Only the breakpoints that are not being used for control are adapted or updated to the function generator 35 by a breakpoint update signal 39. The part of the curve that is being used for control of the process 38 is stored in memory until it is not used for control. At that time the function generator 35 can be updated with the stored information. This procedure allows a continual update of the process demand signal 37 without upsetting the control process, as shown in block 38. The greater the number of breakpoints, the greater the accuracy. It will also be understood by those skilled in the art that other characterization or linearization methods such as regression analysis (i.e., piece-wise regression) may also be used for linearizing the feedforward control signal.

Figure 2:
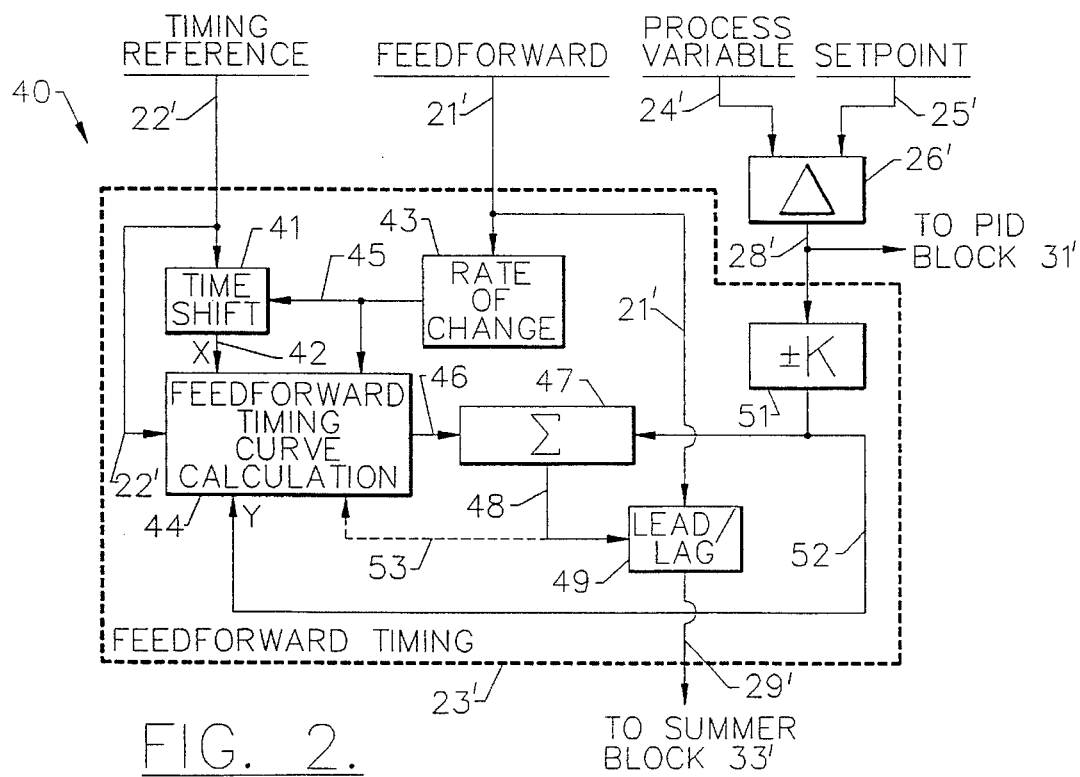
FIG. 2 is a block diagram of the feedforward timing characterization of an industrial process controller of the present invention as shown in FIG. 1.

FIG. 2 illustrates a block diagram 48 for calculating and utilizing a feedforward timing curve to thereby further explain the synchronized timing signal of block 23 of FIG. 1, and as indicated by the phantom-line box 23'. Like elements with the block diagram of FIG. 1 are designated with prime (') notation for purpose of clarity. When proper feedforward control characterization 30 (FIG. 1) is in operation, correct timing synchronization of the feedforward signal 21 should also be implemented for good control of an industrial process, as shown in block 23'. For example, if a feedforward control signal moves the process demand or command signal too early, the process variable will be greater than a predetermined set point. Of course, if the process demand moves too late the process variable will be lower than a predetermined set point. A relationship exists between a process error signal or difference signal 28' and a timing reference signal 22' for feedforward timing 23'. The timing synchronization is preferably accomplished by characterizing the timing reference signal to be used by the lead/lag feedforward control signal for improved control of the process demand. Assuming that the feedforward signal 21' has been made linear with respect to the process demand signal 37 (FIG. 1), a curve which is indexed by a timing reference signal 22' can be established for the feedforward timing signal 29'. It will be apparent to those skilled in the art that the timing reference signal 22' can be the feedforward signal 21' or any signal that is related to the timing of the process. The feedforward timing synchronization shown as block 23' performs a feedforward timing curve calculation. Two timing curves per control loop may be needed. One timing curve may be needed when the feedforward signal 21' is increasing and another timing curve may be needed when the feedforward signal 21' is decreasing. Also, in complex industrial process systems, more than one timing reference signal (as shown in FIGS. 5–8) may be needed for optimum results.

As shown in FIG. 2, there is a timing shifting means, shown as time shift block 41 in the timing reference signal 22'. Because all processes have some lag in them, a presently-detected process error is the result of a feedforward control timing problem that occurred in the past. It is therefore necessary to time-shift the new collected data back in time when the cause of the process error actually happened. The calculated time shift 41 is proportional to the rolling average of the derivative of the feedforward signal. The timing curve is corrected to the updated index point. If the process error is added to the timing curve when the feedforward control is increasing, then it will be subtracted from the timing curve when the feedforward control is decreasing.

The timing reference signal 22' preferably is used to index the feedforward timing curve calculation 44 to the lead/lag function 49. The lead/lag function 49 refers to actual time leads and lags with respect to a predetermined common reference signal of the industrial process system. If the feedforward timing curve calculation 44 is not accurate, then there will be a process error. The timing curve 44 is corrected with the process error signal 52 (i.e., by changing the "Y" part of a breakpoint by the gained error). The new curve will be used when the feedforward control signal 29' passes through this area of control again in the future.

The feedforward timing curve calculation 44 is preferably performed by an interactive process. The time shifted signal 42 and the process error signal 52 are the data signals used for calculating the updated timing curve 44. The curve is calculated by using a similar process as in the feedforward control linearization 30 as described with reference to FIG. 1. When generating the timing curve 44, the "Y" component is calculated using the process error signal 52, and the "X" component is the time shifted reference signal 42. The "X" or input will be predefined, while the "Y" or output of the curve will be moved by the process error signal 52. The updated point is added to the curve only after the feedforward signal 21' stops moving as detected by the rate of change block 43, thus allowing a transparent transition or update. The X and Y data is only taken when the feedforward signal 21' is moving.

The summer or adder 47, as shown in FIG. 2, receives the present timing signal 46 and the process error signal 52 and generates an output to the lead/lag function 49. The process error signal 52 received by the summer 47 is used to temporarily bridge the difference between the inadequacies of an existing timing curve and the needs of the present process timing. This slows down the process of correcting the timing curve, but helps the present control stay closer to a set point 25'. As with the correcting of the timing curve, the sign ("+" or "−") of the process error signal 52' entering the summer 47 (sum of the present timing curve signal and the process error signal) will change when the feedforward control changes directions by using transfer gain (±K) block 51. It will also be apparent to those skilled in the art that other feedforward timing calculation techniques such as regression analysis may also be used. For example, if regression analysis is used dashed line 53 will be substituted for the process error signal 52 for providing the "Y" data component.

Figure 3:
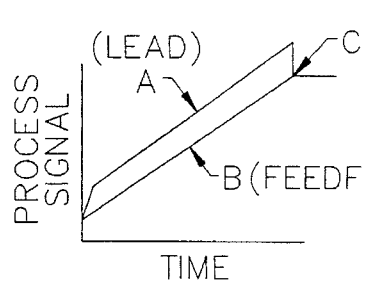
FIG. 3 is graphical plot of a feedforward time lead cutoff.

FIG. 3 is a graphical plot of a feedforward time lead cutoff. The feedforward control timing lead is stopped when the feedforward signal reaches the end of the ramp C of the feedforward signal B. This is done to prevent the process from overshooting a set point. The bleed off of the timing lead A is not needed at the end of the ramp C due to the feedforward control linearization 30 as previously described with reference to FIG. 1.

Figure 5:
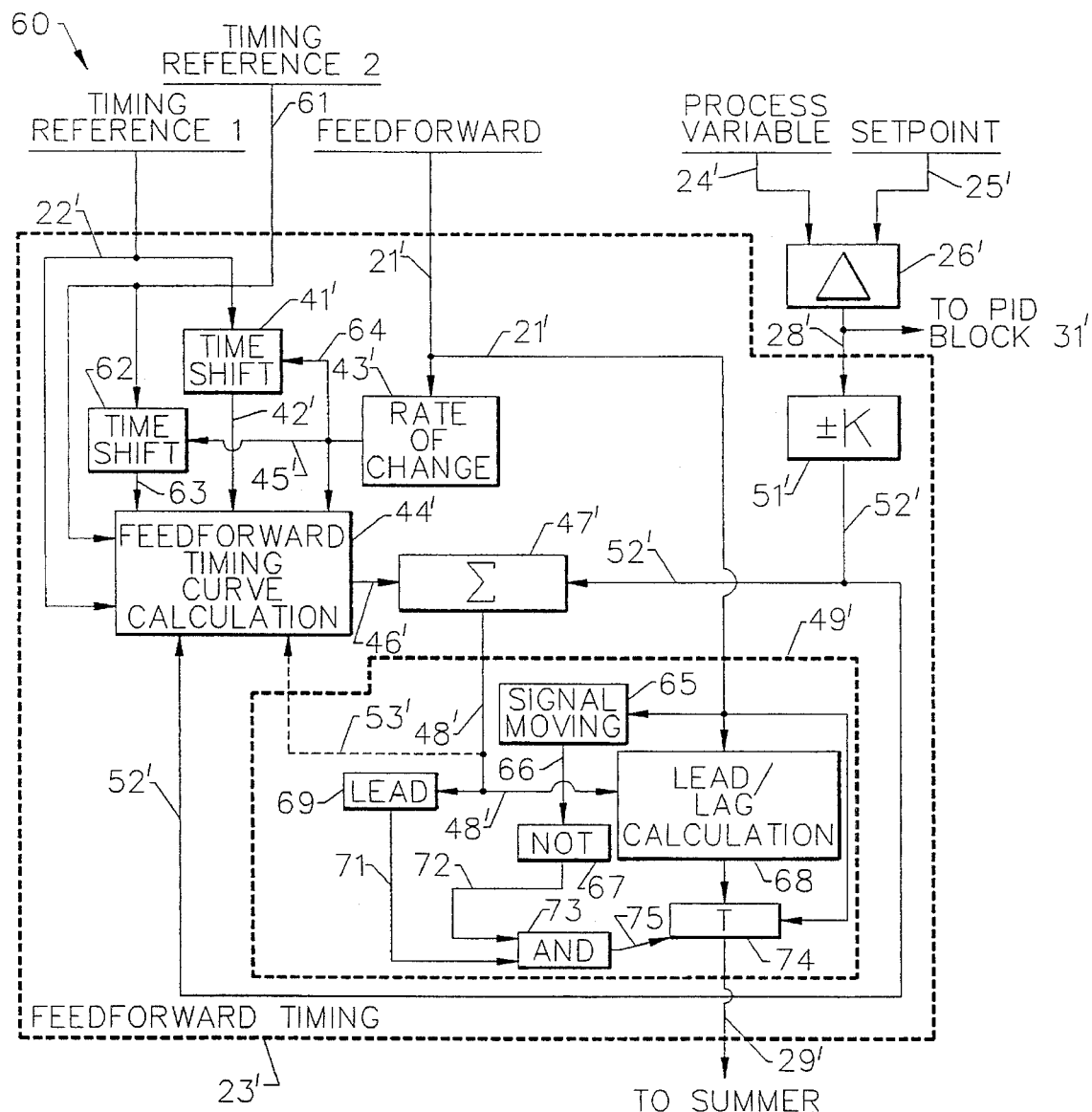
FIG. 5 is a block diagram for further illustrating the timing synchronization of an industrial process controller according to the present invention.

FIG. 5 illustrates a block diagram 60 for the feedforward timing curve calculation and the feedforward time lead/lag calculation of an industrial controller according to the present invention. Like elements with the block diagrams of FIGS. 1 and 2 are designated with prime (') notation for purpose of clarity. The feedforward time lead cutoff as illustrated in FIG. 3 is accomplished by using the NOT moving signal 72, generated as an output of NOT gate 67, and the AND 73 as shown in FIG. 5. This cutoff only applies when the command or process signal 37 (FIG. 1) is a lead signal by using a transfer ("T") block 74 (i.e., switch).

Figure 4:
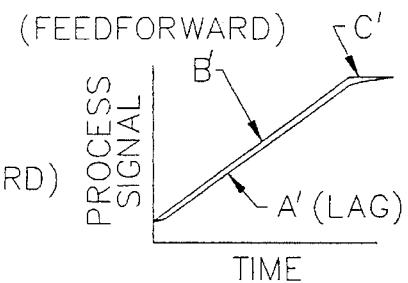
FIG. 4 is a graphical plot of a feedforward time lag.

FIG. 4 is a graphical plot of a feedforward time lag. As shown in FIG. 4, if the feedforward timing signal 48' (FIG. 8) is a lag A', then normal decay of the lag A' will take place at the end of the ramp C of the feedforward signal B. The controller configuration as illustrated in FIG. 5 will still be used, but the lead signal 71 will be disabled.

FIG. 6A is a block diagram of an industrial process controller 80 according to a first embodiment of the present invention. Like elements with block diagrams of FIGS. 1, 2, and 5 are designated with prime (') notation for purposes of clarity. In a conventional controller, when the feedforward signal is moving a small process error can be present. If the error is continuous on a long feedforward control ramp, the integral part of the PID control can windup. When the feedforward signal reaches the end of the ramp, severe overshooting or undershooting of the set point will occur and results in temporary oscillations. The integral windup also negatively affects updating of the timing curves. To prevent this, the integral part of the PID controller 31' is blocked and slowly moved preferably to near zero concurrently with the movement of the feedforward signal 21' as detected by the signal moving block 84.

Figure 6B:
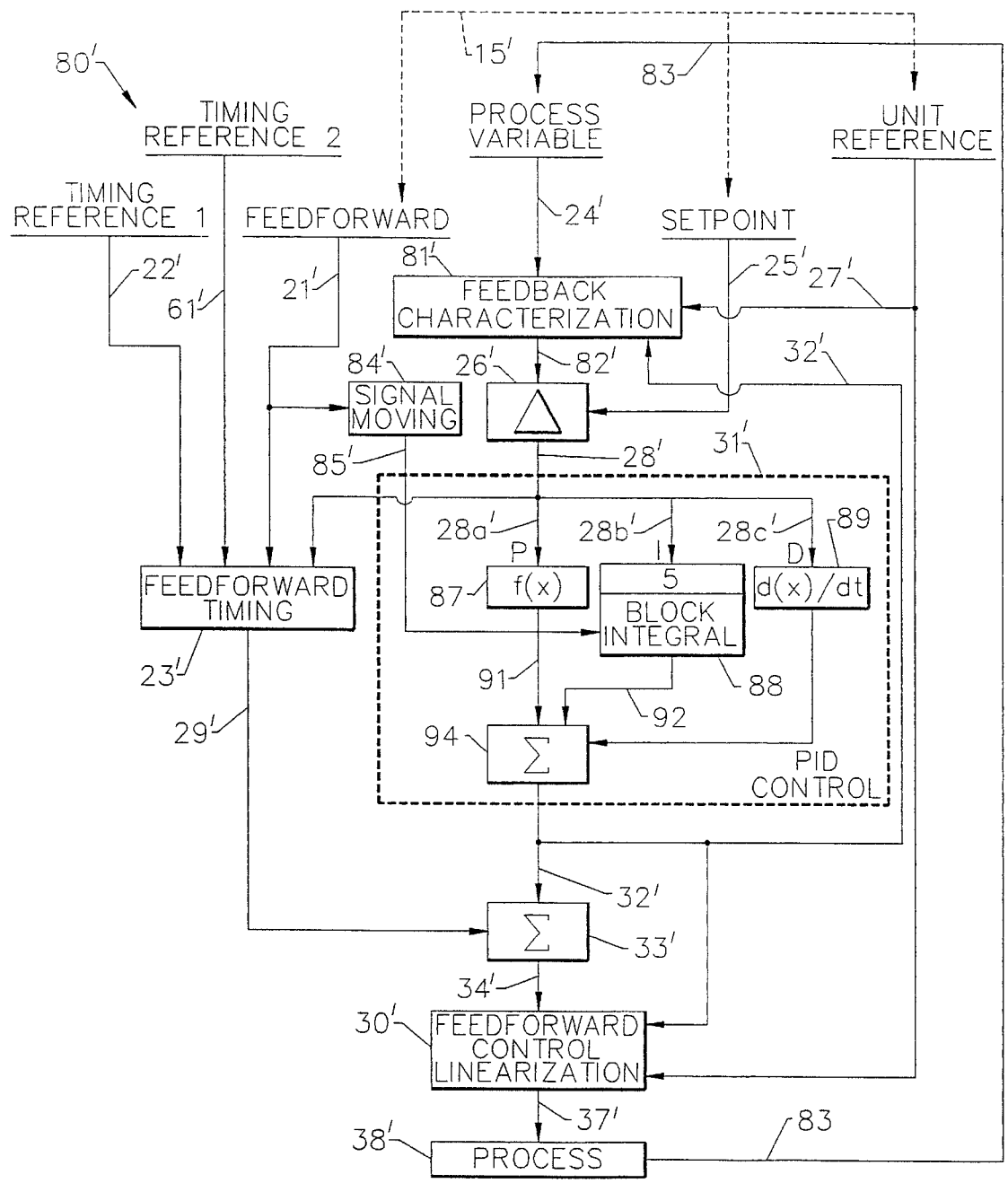
FIG. 6B is a block diagram for illustrating integral blocking of a PID controller according to a first embodiment of an industrial process controller of the present invention.

FIG. 6B is a block diagram of an industrial controller according to the present invention further illustrating integral blocking. As shown in FIG. 6B, the integral signal is blocked 88 whenever the feedforward signal 21' is moving as detected by the signal moving block 84'. The integral blocking 88 will be released when the feedforward signal 21' is not moving 84'. The proportional gain 87 is characterized in such a way that when the process variable signal 24' is near the set point signal 25', the gain is small. As the process variable signal 24' moves further from the set point signal 25', the proportional gain 87 increases. The proportional gain curve 87 is indexed from the process error signal 28a'. The shape of the proportional gain curve 87 is tunable and can be changed from one process to the next.

The controller 80' includes the combination of the self-adjusting feedforward control timing 23' of FIG. 2 and the self-adjusting process demand for feedforward control linearization 30' as shown in FIG. 1. The integral 88 is separated from the proportional 87 and the derivative 89 so that the integral 88 can be blocked as shown in FIG. 6B. The characterized proportional gain signal 91 is generated from a function generator 87'. The proportional gain 91, the integral signal 92, and the derivative signal 93 are summed 94 to form the PID controller output signal 32'. The output signal 32' of the PID controller 31', in turn, is summed 33' with the feedforward timing signal 29' of the self-adjusting feedforward timing control 23'. The resulting signal 34' is fed into the self-adjusting process demand for feedforward control linearization 30'. The output of the process demand is the output of the industrial process controller 80' to the process 38.

Figure 7:
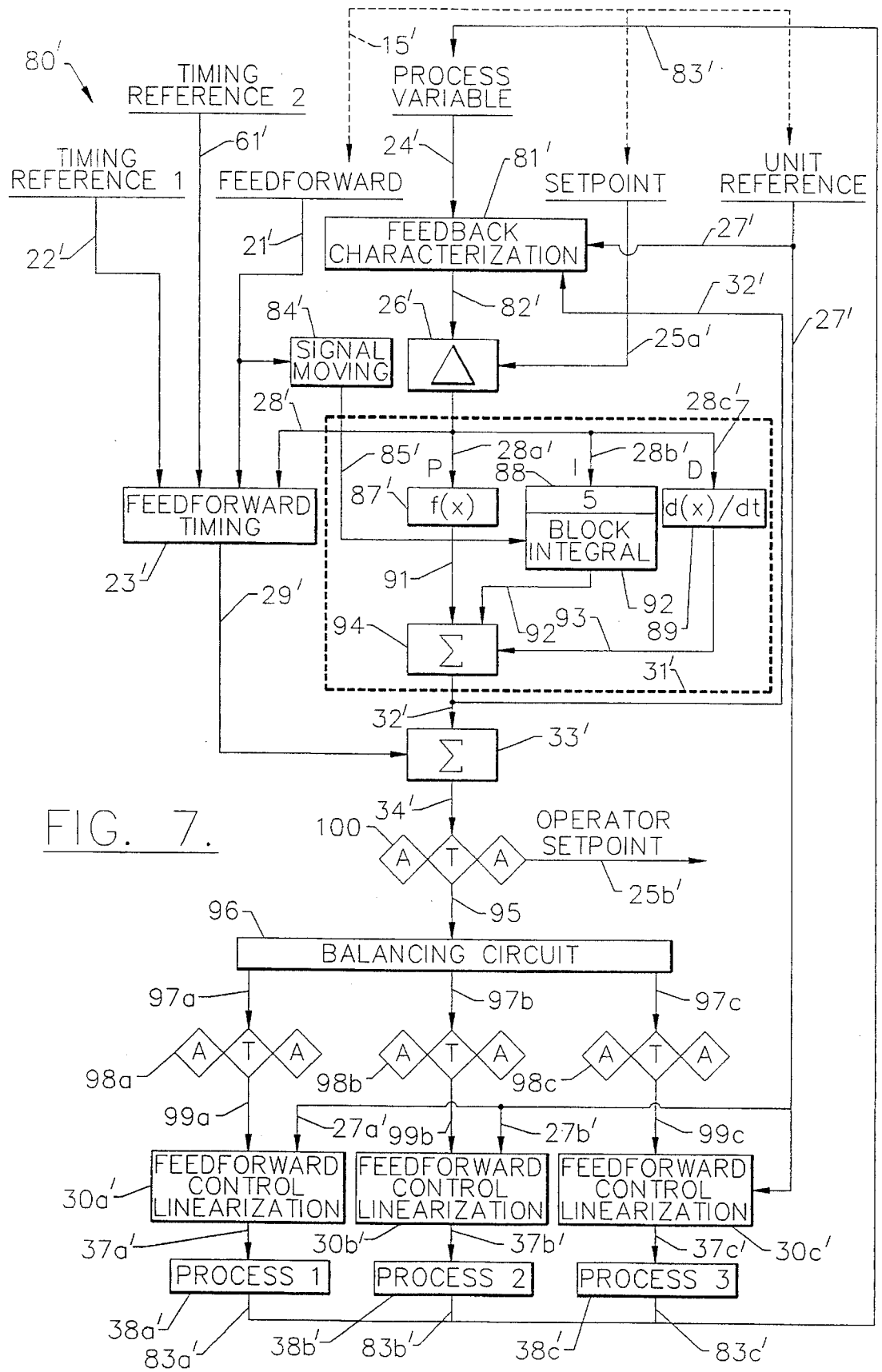
FIG. 7 is a block diagram illustrating an industrial process controller according to a second embodiment of the present invention with balancing capabilities and being adapted for several different processes.

FIG. 7 is a block diagram illustrating an industrial process controller 80' according to the present invention being adapted for several different industrial processes. As illustrated, the feedforward control linearization 30a', 30b', 30c' can be configured for several processes (i.e., three processes 38a, 38b, 38c) with a balancing means, such as biasing integrating calculation, as shown by block 96. The self-adjusting process demand 37a', 37b', 37c' can be selected or deselected in order to fit the environment and/or to feed more than one controller. It will also be understood that feedforward control characterization as illustrated by blocks 30a, 30b, 30c could be performed by multivariable analysis.

The self adjusting feedback characterization as shown in FIG. 7 (and FIGS. 6A and 6B) is used in the case where the set point 25a is the feedforward signal. This case is most often when controlling a flow type of process. The output of the feedback characterization signal 82 should equal feedforward or unit reference signal under a static condition without introducing any correction from the PID controller 31'. The PID output signal 32' can be used to update or correct the feedback characterization curve as previously described with reference to in FIGS. 1 and 2 with the feedforward control characterization and the feedforward timing curve calculation. It will also be understood that regression analysis or other characterization techniques may be used.

Figure 8:
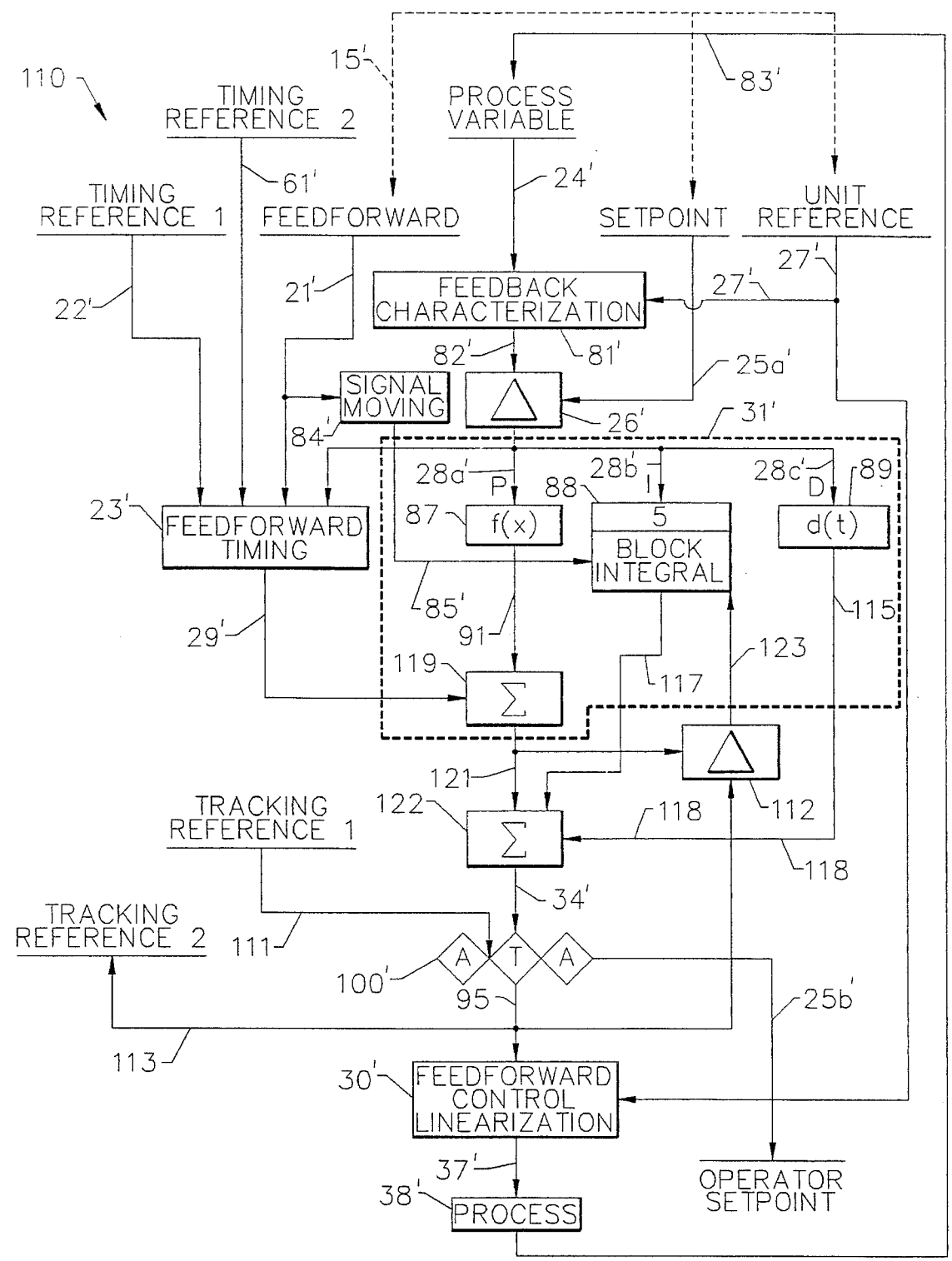
FIG. 8 is a block diagram illustrating an industrial process controller according to a second embodiment of the present invention with tracking capabilities for a second controller upstream or downstream of a first controller.

FIG. 8 is a block diagram illustrating an industrial process controller 110 according to a second embodiment of the present invention with tracking capabilities for a controller such as a second controller upstream or downstream of a first controller. In a second embodiment of the industrial controller 110, the self-adjusting process demand 37' may be in a second controller upstream or downstream from this first controller 110. Also, a tracking reference 1 signal 111 such as from a second downstream controller may be an input to the first controller 110 for communication. Likewise, a tracking reference 2 signal 113 such as to a third upstream controller that reflects the feedforward control derived from the limits of the control range of the first controller 110 may be sent to the third upstream controller to prevent windup or for other purposes. The controller 110 tracks to the downstream tracking reference 1 signal 111 when the second downstream controller is in a manual-type operation. The controller 110 also has balancing tracking means that tracks any manual changes that an operator 100' makes. The downstream process demand limits of the second controller.

The PID controller 31' of the second embodiment is modified as illustrated for balanced tracking purposes. In such circumstances, the derivative 89 is transferred (T) 114 to zero and the integral signal 117 absorbs the difference signal 123 as transferred (T) 116 from differentiator 112. The difference signal 123 is the difference between the station output signal 95 and the feedforward timing signal 29' plus the proportional signal 91 output 121 from summer 119. This results in summer 122 output signal 34' and the station output signal 95 being equal allowing a bumpless or smooth transfer between manual and automatic are also reflected back to the first controller 110. The controller outputs a signal indicative of the feedforward control signal thereby allowing upstream or downstream tracking.

As illustrated with reference to FIGS. 1–8, and more particularly to FIG. 6, methods of controlling an industrial process are also provided according to the present invention. These methods include the steps of receiving a process variable signal for indicating a process condition to control and receiving a set point signal for indicating a desired condition to control. A difference signal is determined between the process variable signal and the set point signal. A synchronized timing signal is generated responsive to the difference signal. A lead/lag feedforward signal is generated responsive to the difference signal and the synchronized timing reference signal is generated for the lead/lag feedforward signal. An output signal of a PID controller is generated responsive to the difference signal and the generating of the output signal of the PID controller includes the step of blocking an integral signal of the PID controller responsive to the feedforward control signal. The output signal of the PID controller is combined with the lead/lag feedforward signal and a command signal for the process variable is generated therefrom. The command signal for control of the process variable is stored and the feedforward signal is characterized for the process variable responsive to the command signal and the output signal of the PID controller. The feedforward signal is characterized by generating a function signal responsive to the command signal and changing the function signal responsive to the output signal of the PID controller to thereby control an overall gain of the process variable responsive to the set point.

The methods also include the steps of generating a feedback control signal responsive to the command signal and characterizing the feedback signal responsive to the process variable for controlling the overall gain of the process variable. The method steps further include tracking and balancing of the feedforward signal responsive to an input signal external to the industrial process controller as discussed with reference to the second embodiment of the present invention.

The implementation of the industrial controller, and the methods of industrial process control, for industrial processes such as power utility industries or petroleum industries are preferably implemented with a combination of hardware and software. A software based controller using a predetermined computer program in a computer or central processing unit may also be used. It will be understood by those skilled in the art that other mechanical and/or electrical implementations may also be used for various industrial process controls.

In the drawings and specification, there have been disclosed illustrated embodiments of the invention and, although specific terms are employed, these terms are used in a generic and descriptive sense only and not for the purposes of limitation. The invention has been described in considerable detail with specific reference to various illustrated embodiments. It will be apparent, however, that various modifications and changes can be made within the spirit and scope of the invention as described in the foregoing specification and defined in the appended claims.

That which is claimed is:

1. An industrial process controller for controlling a process variable responsive to a set point, said controller comprising:

difference means for determining a difference signal between a process variable and a set point;

timing synchronization means operatively connected to said difference means for generating a synchronized timing reference signal responsive to said difference signal;

feedforward control means operatively connected to said difference means and said timing synchronization means for generating a lead/lag feedforward signal responsive to said difference signal and said synchronized timing reference signal;

proportional and derivative control means operatively connected to said difference means and said timing synchronization means for generating a proportional output signal and a derivative output signal responsive to said difference signal; and combining means operatively connected to said feedforward control means and said proportional and derivative control means for combining said proportional and derivative output signals of said proportional and derivative control means with said lead/lag feedforward signal to thereby generate a combined output command signal therefrom to control gain between the process variable and the set point of the industrial process.

2. An industrial process controller according to claim 1, further comprising feedforward characterization means operatively connected to said proportional and derivative control means and said combining means for characterizing said feedforward signal and generating a command signal therefrom to thereby control gain of the industrial process.

3. An industrial process controller according to claim 2, wherein said feedforward characterization means comprises means for generating a function signal responsive to said command signal and means for changing said function signal responsive to said proportional and derivative output signals of said proportional and derivative control means.

4. An industrial process controller according to claim 1, wherein said proportional and derivative control means further comprises means for generating an integral signal and means for blocking said integral signal thereof responsive to said feedforward signal.

5. An industrial process controller according to claim 1, further comprising feedback characterization means operatively connected to said difference means and said combining means for providing thereto a characterized feedback control signal to said difference means.

6. An industrial process controller according to claim 1, wherein said difference means comprises means for determining a process variable value and means for subtracting a predetermined set point value therefrom.

7. An industrial process controller according to claim 1, wherein said timing synchronization means comprises timing reference generating means for generating a timing reference signal and characterization means for characterizing said timing reference signal based upon said difference signal generated from said difference means to thereby synchronize said lead/lag feedforward signal.

8. An industrial process controller according to claim 7, wherein said characterizing means comprises means for generating a function signal responsive to said timing reference signal and said difference signal and means for changing said function signal responsive to said feedforward signal.

9. An industrial process controller according to claim 1, further comprising tracking means for generating a tracking signal responsive to said feedforward signal and means for balancing said feedforward signal responsive to an input signal external to the industrial process controller.

10. An industrial process controller according to claim 1, further comprising storing means for storing said command signal for control of the process variable.

11. An industrial process controller according to claim 1, further comprising means for receiving a process variable signal by the process controller indicating a process condition to control and means for receiving a set point signal by the process controller indicating a desired condition to control.

12. An industrial process controller for controlling a process variable responsive to a set point, said controller comprising:

difference means for determining a difference signal between a process variable and a set point;

timing synchronization means operatively connected to said difference means for generating a synchronized timing reference signal responsive to said difference signal;

feedforward control means operatively connected to said difference means and said timing synchronization means for generating a lead/lag feedforward signal responsive to said difference signal and said synchronized timing reference signal;

PID control means operatively connected to said difference means and said timing synchronization for generating an output signal responsive to said difference signal, said PID control means comprising means for generating a proportional signal, an integral signal, and a derivative signal, and means for blocking said integral signal thereof responsive to said feedforward signal;

combining means for combining said output signal of said PID control means with said lead/lag feedforward signal to thereby generate a command signal for the process variable;

feedforward characterization means operatively connected to said PID control means and responsive to said combining means for characterizing said command signal generated by said combining means, said feedforward characterization means comprising means for generating a function signal responsive to said command signal and means for changing said function signal responsive to said output signal of said PID control means; and feedback characterization means operatively connected to said difference means and said combining means for providing thereto a characterized feedback control signal responsive to said command signal to thereby control gain between the process variable and the set point of the industrial process.

13. An industrial process controller according to claim 12, wherein said timing synchronization means comprises timing reference generating means for generating a timing reference signal and characterization means for characterizing said timing reference signal based upon said difference signal generated from said difference means to thereby synchronize said lead/lag feed forward control signal.

14. An industrial process controller according to claim 13, wherein said characterizing means comprises means for generating a function signal responsive to said timing reference signal and said difference signal and means for changing said function signal responsive to said feedforward signal.

15. An industrial process controller according to claim 12, further comprising storing means for storing said command signal for control of the process variable.

16. An industrial process controller according to claim 12, further comprising tracking means for tracking said feedforward signal and means for balancing said feedforward signal responsive to an input signal external to the process controller.

17. An industrial process controller for controlling a process variable responsive to a set point, said controller comprising:

difference means for determining a difference signal between a process variable and a set point;

timing synchronization means operatively connected to said difference means for generating a synchronized timing reference signal, said timing synchronization means comprising a timing reference signal and characterization means for characterizing said timing reference signal based upon said difference signal generated by said difference means, said characterizing means comprising means for generating a function signal responsive to said timing reference signal and said difference signal and means for iteratively changing said function signal;

feedforward control means operatively connected to said difference means and said timing synchronization means for generating a lead/lag feedforward signal responsive to said difference signal and said synchronized timing reference signal;

PID control means operatively connected to said difference means and said timing synchronization means for generating an output signal responsive to said difference signal, said PID control means comprising means for generating a proportional signal, an integral signal, and a derivative signal, and means for blocking said integral signal thereof responsive to said feedforward signal;

combining means for combining said output signal of said PID control means with said feedforward signal to thereby generate a command signal for the process variable; and feedforward characterization means operatively connected to said PID control means and responsive to said combining means for providing a characterized feedforward signal to said command signal, said feedforward characterization means comprising means for generating a function signal responsive to said command signal and means for iteratively changing said function signal responsive to said output signal of said PID control means.

18. An industrial process controller according to claim 17, further comprising feedback characterization means operatively connected to said difference means and said combining means for providing thereto a characterized feedback control signal to said difference means.

19. An industrial process controller for controlling a process variable responsive to a set point, said controller comprising:

difference means for determining a difference signal between a process variable and a set point;

timing synchronization means operatively connected to said difference means for generating a synchronized timing reference signals, said timing synchronization means including timing reference generating means for generating a timing reference signal and characterization means for characterizing said timing reference signal based upon said difference signal generated from said difference means; and feedforward control means operatively connected to said difference means and said timing synchronization means for generating a lead/lag feedforward signal responsive to said difference signal and said timing synchronization signal to thereby more effectively control gain between the process variable and the set point of the industrial process.

20. An industrial process controller according to claim 19, wherein said characterizing means comprises means for generating a function signal responsive to said timing reference signal and said difference signal and means for changing said function signal responsive to said feedforward signal.

21. A method of controlling a process variable responsive to a set point, comprising the steps of:

generating a difference signal between a set point and a process variable;

generating a timing reference signal;

synchronizing the timing reference signal responsive to the difference signal;

generating a function signal responsive to the timing reference signal and the difference signal;

generating a lead/lag feedforward control signal responsive to the function signal; and changing the function signal responsive to the feedforward control signal to thereby control the overall gain between a set point and a process variable.

22. A method of controlling a process variable responsive to a set point, comprising the steps of:

determining a difference signal between a process variable and a set point;

generating a synchronized timing signal responsive to the difference signal;

generating a lead/lag feedforward signal responsive to the synchronized timing reference signal and the difference signal;

generating proportional and derivative output signals responsive to the difference signal;

combining the proportional and derivative output signals with the lead/lag feedforward signal; and generating a command signal for the process variable responsive to the combining of the proportional and derivative output signals and the lead/lag feedforward signal to thereby control overall gain between the process variable and the set point of the industrial process.

23. A method according to claim 22, further comprising the step of characterizing the feedforward signal responsive to the command signal and the proportional and derivative output signals.

24. A method according to claim 23, wherein the step of characterizing the feedforward signal includes the steps of generating a function signal responsive to the command signal and changing the function signal responsive to the proportional and derivative signals.

25. A method according to claim 22, wherein the step of generating the proportional and derivative output signals further includes the steps of generating an integral signal responsive to the difference signal and blocking the integral signal responsive to the feedforward signal.

26. A method according to claim 22, further comprising the steps of generating a feedback signal responsive to the command signal and characterizing the feedback signal responsive to the process variable.

27. A method according to claim 22, wherein the step of determining the difference signal includes the steps of determining a process variable value and subtracting a predetermined set point value therefrom.

28. A method according to claim 22, further comprising the step of generating a timing reference signal for the lead/lag feedforward signal.

29. A method according to claim 22, further comprising the steps of tracking the feedforward signal and balancing the feedforward signal responsive to an external input signal.

30. A method according to claim 22, further comprising the step of storing the command signal for control of the process variable.

31. A method according to claim 22, wherein the step of determining a difference signal is preceded by the steps of receiving a process variable signal for indicating a process condition to control and receiving a set point signal for indicating a desired condition to control.

32. A method of controlling a process variable responsive to a set point, comprising the steps of:

receiving a process variable signal for indicating a process condition to control;

receiving a set point signal for indicating a desired condition to control;

determining a difference signal between the process variable signal and the set point signal;

generating a synchronized timing signal responsive to the difference signal;

generating a feedforward signal responsive to the difference signal and the synchronized timing signal;

blocking an integral signal of a PID controller responsive to the feedforward signal;

generating an output signal of the PID controller responsive to the difference signal;

combining the output signal of the PID controller with the feedforward signal;

generating a command signal for the process variable;

storing the command signal for control of the process variable;

generating a feedforward control function signal responsive to the command signal;

changing the feedforward control function signal responsive to the output signal of the PID controller;

generating a feedback signal responsive to the command signal; and characterizing the feedback signal responsive to the process variable to thereby control gain between the process variable and the set point of the process.

33. A method according to claim 32, wherein the step of determining the difference signal includes the steps of determining a process variable value and subtracting a predetermined set point value therefrom.

34. A method according to claim 32, further comprising the steps of tracking the feedforward signal and balancing the feedforward signal responsive to an external input signal.

* * * * *

UNITED STATES PATENT AND TRADEMARK OFFICE
CERTIFICATE OF CORRECTION

PATENT NO.   : 5,504,672
DATED        : April 2, 1996
INVENTOR(S)  : Hardiman et al.

It is certified that error appears in the above-indentified patent and that said Letters Patent is hereby corrected as shown below:

Column 15, line 13, "signals" should be --signal--;

Signed and Sealed this

Eleventh Day of March, 1997

Attest:

BRUCE LEHMAN

*Attesting Officer*     Commissioner of Patents and Trademarks